United States Patent [19]

Wilkinson

[11] Patent Number: 4,875,819
[45] Date of Patent: Oct. 24, 1989

[54] WHEEL LOCK SYSTEM APPARATUS

[76] Inventor: Kevin Wilkinson, 2050 S. Ridgewood Ave. #C-24, S. Daytona Beach, Fla. 32019

[21] Appl. No.: 255,955

[22] Filed: Oct. 11, 1988

[51] Int. Cl.[4] .......................... F16B 37/08; F16B 41/00
[52] U.S. Cl. ..................................... 411/432; 411/910; 70/231
[58] Field of Search ................ 411/372, 373, 429, 432, 411/910; 70/231, 232

[56] References Cited

U.S. PATENT DOCUMENTS

| | | | |
|---|---|---|---|
| 1,937,848 | 12/1933 | Shinn | 70/231 |
| 3,630,261 | 12/1971 | Gley . | |
| 3,796,074 | 3/1974 | Vik | 70/231 |
| 3,981,467 | 9/1976 | Ludlow . | |
| 4,084,630 | 4/1978 | Lewis . | |
| 4,266,460 | 5/1981 | Klimowicz . | |
| 4,336,698 | 6/1982 | Hurd | 70/231 |
| 4,362,035 | 12/1982 | Vitale | 70/231 |
| 4,436,438 | 3/1984 | Ozaki . | |

FOREIGN PATENT DOCUMENTS 360304  11/1931  United Kingdom ................ 411/910

Primary Examiner—Neill R. Wilson
Attorney, Agent, or Firm—Leon Gilden

[57] ABSTRACT

A wheel lock apparatus is set forth wherein a wheel mount threadedly attaches to an existing axle bolt for securement of a conventional automotive wheel thereto. A reciprocating butterfly latch is mounted within diametrically spaced slots of the wheel mount and is positionable from a retracted position to an extended position by means of an overlying coaxial lock bolt mounted within a positioning cylinder, whereupon positioning of the butterfly latch to the extended orientation enables selective latching of a main hexagonal body containing the positioning cylinder and lock bolt. Upon latching of the main hexagonal body, the wheel mount may be secured or withdrawn from the associated threaded axle mounting member.

2 Claims, 5 Drawing Sheets

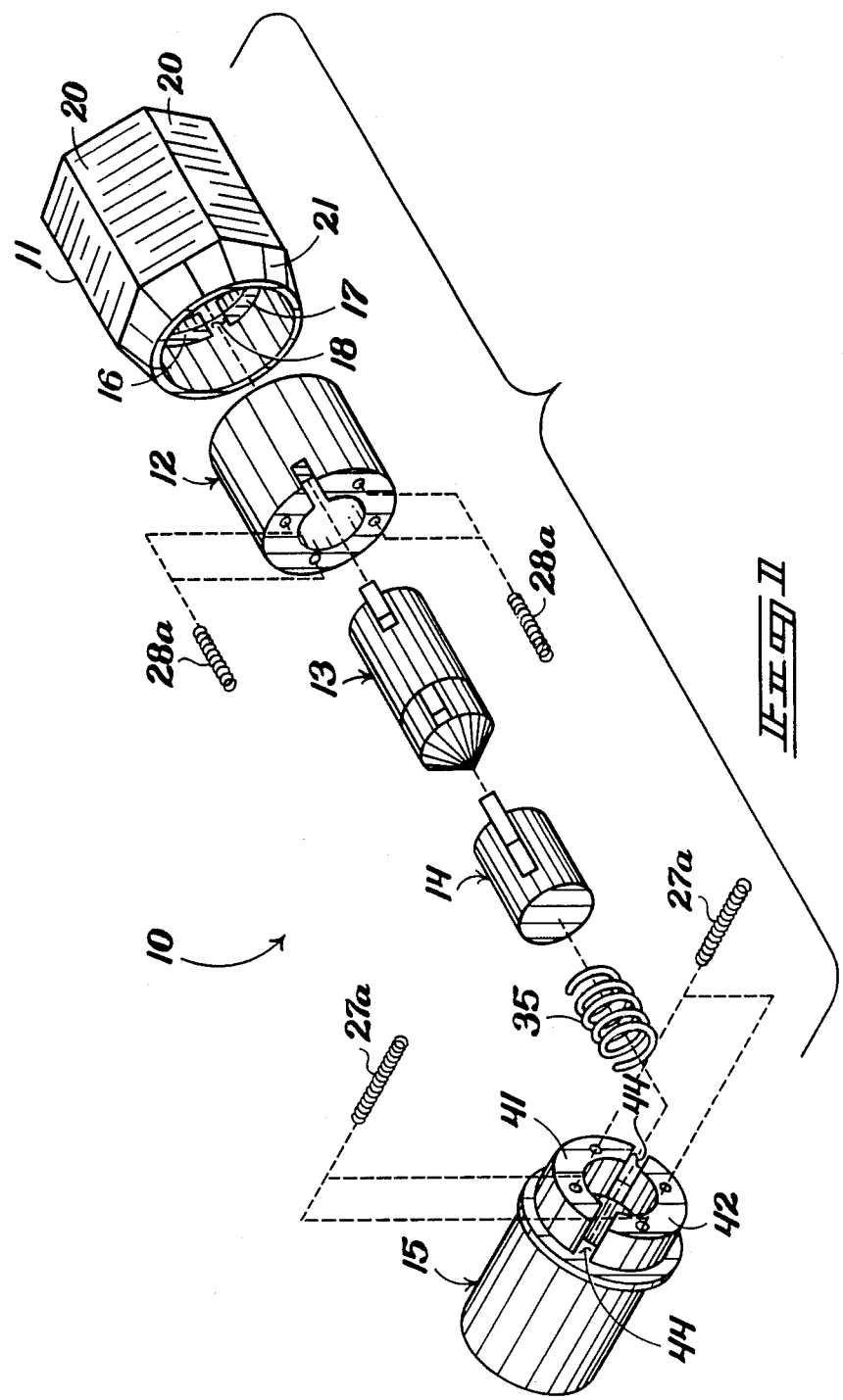

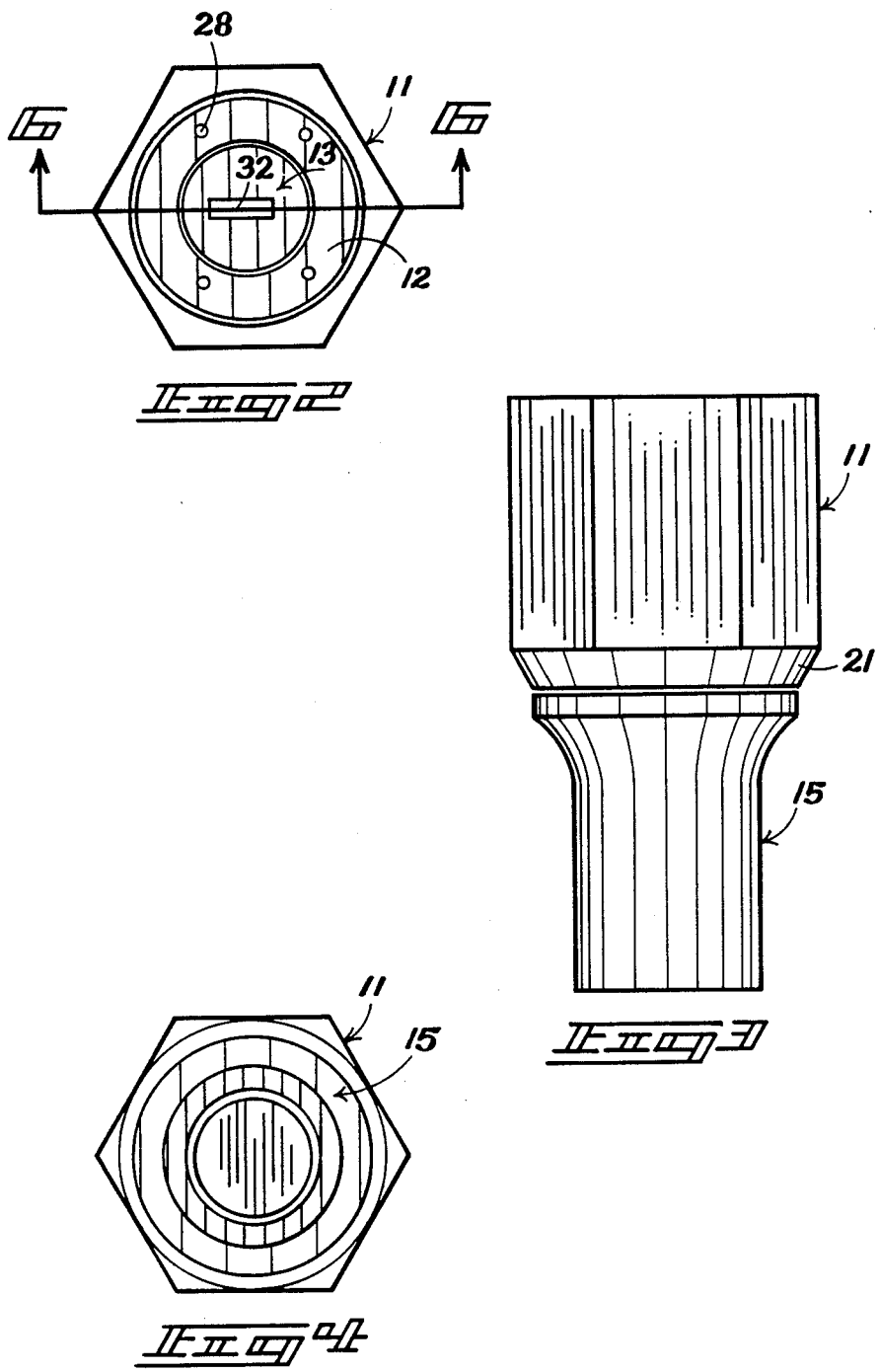

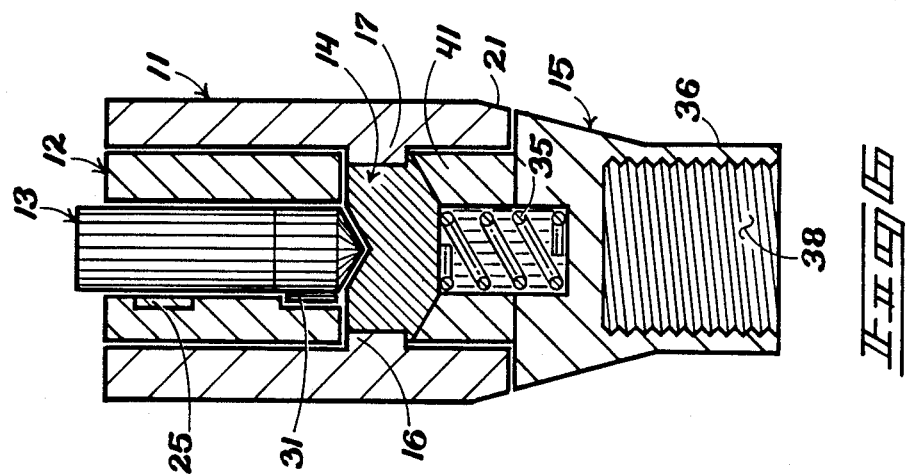
_Fig 6_
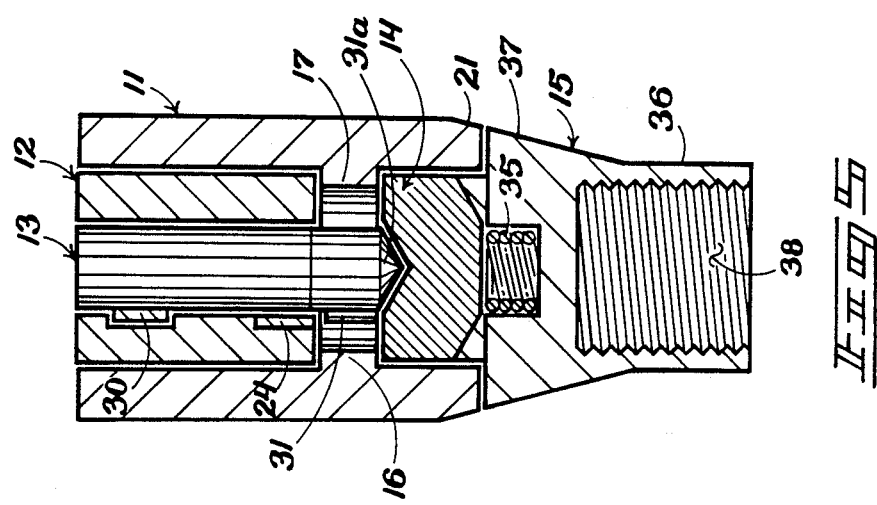
_Fig 5_

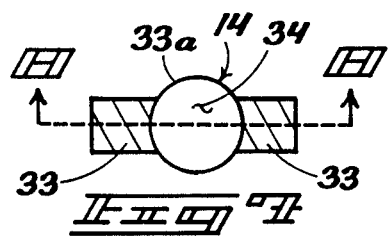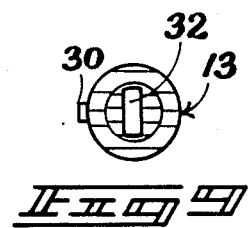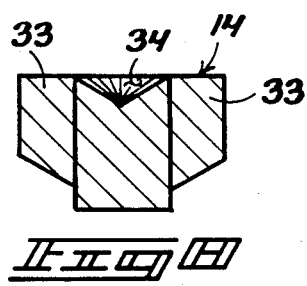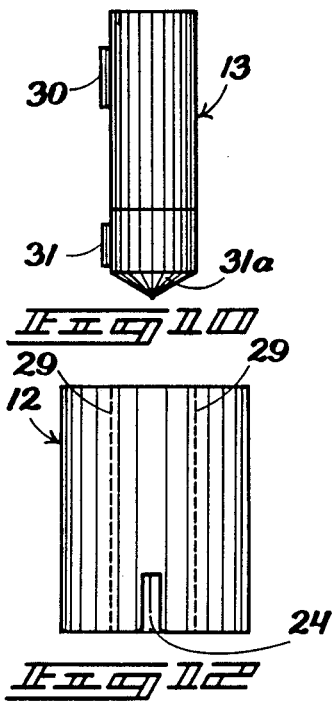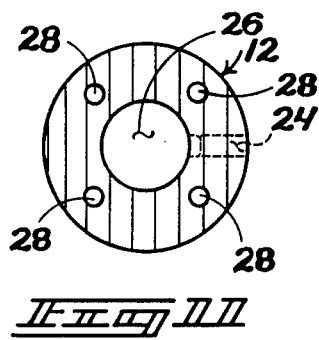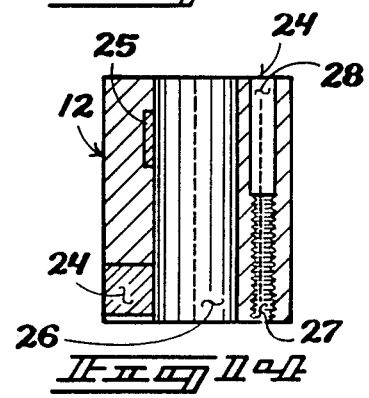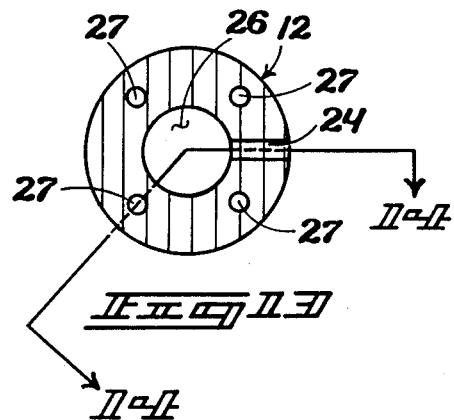

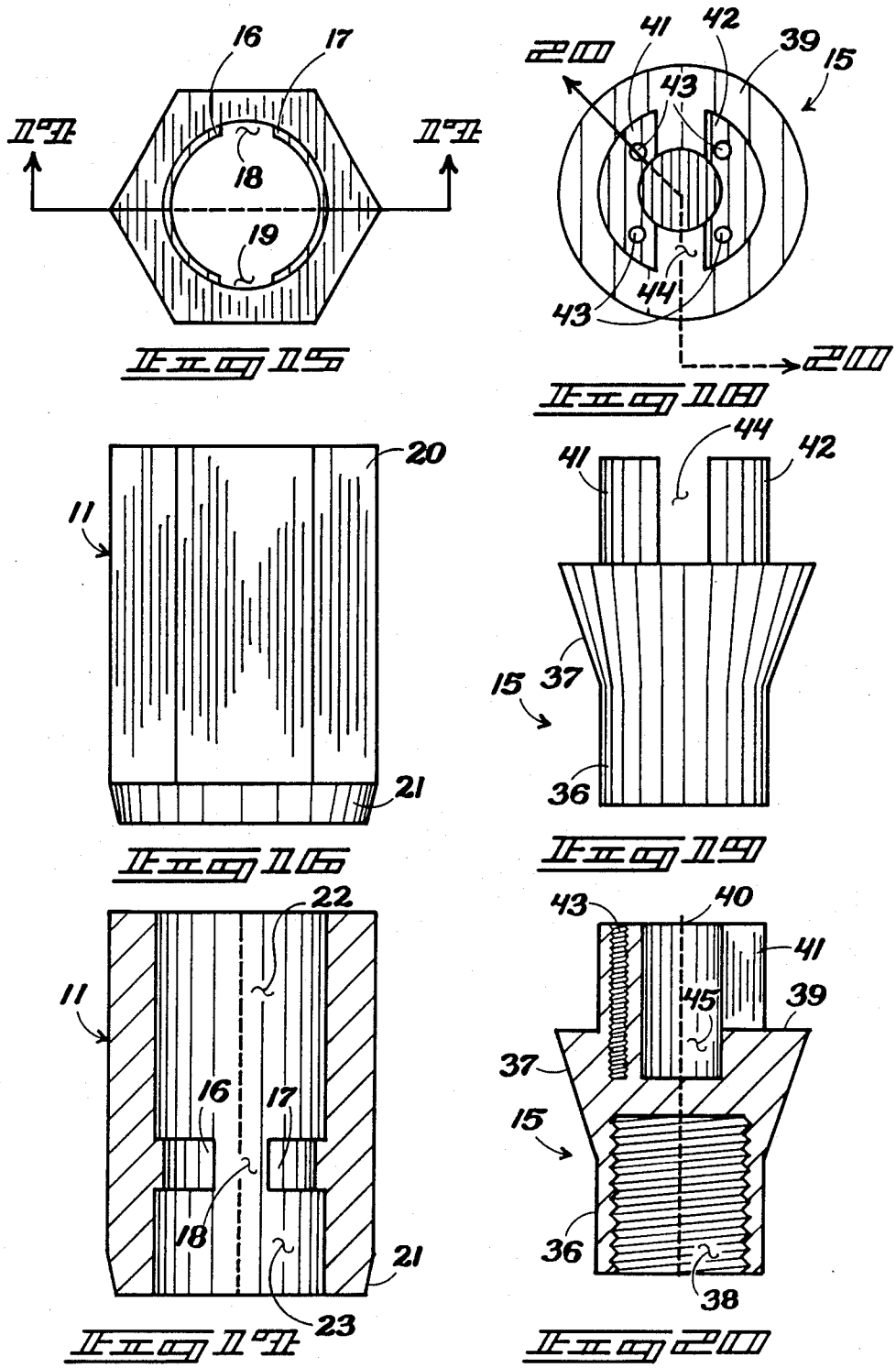

WHEEL LOCK SYSTEM APPARATUS

BACKGROUND OF THE INVENTION

1. Field of the Invention

The field of invention relates to wheel lock apparatus and more particularly pertains to a new and improved wheel lock arrangement which may be selectively secured to a threaded stud to secure an automotive rim thereto and alternatively readily and effectively prevent unwarranted removal of the apparatus from the threaded stud member.

2. Description of the Prior Art

The use of various locking arrangements for wheels and the like is well known in the prior art. Devices in the past have utilized elaborate and extensive arrangements to effect a locking cooperation to secure various members. For example, Gley U.S. Pat. No. 3,630,261 sets forth a nut and stud arrangement wherein a central member independent of the stud and of the nut creates an enhanced frictional interengagement between the aforementioned nut and stud to maintain the two members in an assembled relationship.

Ludlow U.S. Pat. No. 3,981,467 sets forth a locking arrangement for providing locking in the three coordinate axes wherein a single sliding pin connects two sections and is withdrawn only by a pyrotechnic device prior to an associated apparatus achieving orbit. The apparatus is particularly arranged for utilization in space craft applications.

Lewis U.S. Pat. No. 4,084,630 sets forth a locking ring in use with a castellated nut threadedly securable to a bolt wherein a through extending aperture in the bolt cooperates with a spring lock pin associated with the nut to lock the two members together. Klimowicz U.S. Pat. No. 4,266,460 sets forth a threaded rod formed with a planar end surface disposed at a non-orthogonal angulation relative to the axis of a rod wherein a lock pin is positionable through a cap to overlie the end surface wherein the threaded cap is thereby fixedly secured to the rod in a non-rotative manner.

Ozaki U.S. Pat. No. 4,436,468 sets forth a lock nut for use as a component of a bicycle part wherein a split clamping ring is received within an annular groove formed within an annular nut body wherein the nut annular body is provided with a plurality of threaded bores to accept threaded lock members or set screws to extend and deform the locking ring inwardly to maintain the elements in a secured relationship.

As such, it may be appreciated that there is a continuing need for a new and improved wheel lock apparatus as set forth by the instant invention which addresses both the problem of securement and disengagement of the locking apparatus with respect to an associated threaded rod and in this respect, the present invention substantially fulfills this need.

SUMMARY OF THE INVENTION

In view of the foregoing disadvantages inherent in the known types of threaded stud locking arrangements now present in the prior art, the present invention provides a wheel lock apparatus wherein the same may be effectively secured to a threaded stud for association of an automotive type rim thereto and may be easily and efficiently disengaged from the threaded stud during periods of non-use. As such, the general purpose of the present invention, which will be described subsequently in greater detail, is to provide a new and improved wheel lock apparatus which has all the advantages of the prior art threaded stud lock arrangements and none of the disadvantages.

To attain this, the present invention comprises an axially aligned series of interengageable relatively movable elements including a main hexagonal body containing a positioning cylinder wherein the positioning cylinder includes a reciprocating lock bolt axially overlying a butterfly latch containing a plurality of wings depending diametrically opposed relative each other exteriorly of the main butterfly cylindrical body to interengage a split ring within the main hexagonal body while positioned within slots within the associated wheel mount that threaddedly engages a threaded stud member. The reciprocating lock bolt member upon withdrawal into the positioning cylinder enables the butterfly latch to extend to lock the main hexagonal body and wheel mount together to enable relative rotation of the apparatus.

My invention resides not in any one of these features per se, but rather in the particular combination of all of them herein disclosed and claimed and it is distinguised from the prior art in this particular combination of all of its structures for the function specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wheel lock apparatus which has all the advantages of the prior art wheel lock apparatus and none of the disadvantages.

It is another object of the present invention to provide a new and improved wheel lock apparatus which may be easily and efficiently manufactured and marketed.

It is a further object of the present invention to provide a new and improved wheel lock apparatus which is of a durable and reliable construction.

An even further object of the present invention is to provide a new and improved wheel lock apparatus which is susceptible of a low cost of manufacture with regard to both materials and labor, and which accordingly is then susceptible of low prices of sale to the consuming public, thereby making such wheel lock apparatus economically available to the buying public.

Still yet another object of the present invention is to provide a new and improved wheel lock apparatus which provides in the apparatuses and methods of the prior art some of the advantages thereof, while simultaneously overcoming some of the disadvantages normally associated therewith.

Still another object of the present invention is to provide a new and improved wheel lock apparatus wherein the same includes a plurality of axially aligned members that are selectively interengageable to secure an outer main hexagonal body to a threaded stud wheel mount member in a selective manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric exploded view of the instant invention.

FIG. 2 is a top orthographic view of the instant invention.

FIG. 3 is an orthographic view taken in elevation of the instant invention.

FIG. 4 is a cross-sectional top orthographic view of the apparatus taken through the main hexagonal body member.

FIG. 5 is an orthographic view taken along the lines 5—5 of FIG. 2 in the direction indicated by the arrows illustrating the bufferfly latch in a depressed orientation.

FIG. 6 is an orthographic view taken along the lines 6—6 of FIG. 2 in the direction indicated by the arrows illustrating the butterfly latch in extended position.

FIG. 7 is a top orthographic view of the butterfly member of the instant invention.

FIG. 8 is an orthographic view taken along the lines 8—8 of FIG. 7 in the direction indicated by the arrows.

FIG. 9 is a top orthographic view of the reciprocating lock bolt of the instant invention.

FIG. 10 is an orthographic view taken in elevation of the lock bolt of the instant invention.

FIG. 11 is a top orthographic view of the positioning cylinder of the instant invention.

FIG. 12 is an orthographic view taken in elevation of the positioning cylinder of the instant invention.

FIG. 13 is a bottom orthographic view of the positioning cylinder of the instant invention.

FIG. 14 is an orthographic view taken along the lines 14—14 of FIG. 13 in the direction indicated by the arrows.

FIG. 15 is an orthographic top view of the main hexagonal body of the instant invention.

FIG. 16 is an orthographic view taken in elevation of the main hexagonal body of the instant invention.

FIG. 17 is an orthographic view taken along the lines 17—17 of FIG. 15 in the direction indicated by the arrows.

FIG. 18 is an orthographic top view of the wheel mount member of the instant invention.

FIG. 19 is an orthographic view taken in elevation of the wheel mount member of the instant invention.

FIG. 20 is an orthographic view taken along the lines 20—20 of FIG. 18 in the direction indicated by the arrows.

DESCRIPTION OF THE PREFERRED EMBODIMENT

With reference now to the drawings, and in particular to FIGS. 1 to 20 thereof, a new and improved wheel lock apparatus embodying the principles and concepts of the present invention and generally designated by the reference numeral 10 will be described.

More specifically, it will be noted that the wheel lock apparatus 10 essentially comprises a main hexagonal body 11 rotatably receiving a positioning cylinder 12 within an upper bore portion 22, as illustrated in FIG. 17. The positioning cylinder 12 receives a reciprocating lock bolt axially therein with a butterfly latch 14 axially aligned underlying the reciprocating bolt 13 and further including the bufferfly latch 14 reciprocatably mounted within the wheel mount member 15.

Reference to FIGS. 5, 6, and 15 to 17 illustrates the main hexagonal body 11 and its relationship to the organization. More specifically, a first annular rib 16 of less than 180 degrees of arc is aligned with a second annular rib 17 also of less than 180 degrees of arc to create a first and second gap 18 and 19 diametrically aligned with one another. The first and second gap 18 and 19 slidingly receives the butterfly latch 14 when the butterfly latch 14 is in an extended position, as illustrated in FIG. 6 for example.

The main hexagonal body 11 is formed with a series of six flats 20 to receive a wrench or the like for rotatably applying torque to the apparatus 10 upon securement to a threaded stud, as typically found in automotive environments to receive an automotive wheel. The main hexagonal body 11 is provided with a tapered nose 21 defined by a generally conical planar revolution of equal dimensions to the conical upper body 37 of the wheel mount member 15 to provide a continuous surface. The upper bore 22 of the main hexagonal body 11 is aligned with the lower bore 23 and of equal diameter wherein the lower bore 23 accepts the first and second annular projections 41 and 42 of the wheel mount member 15 therein, to be discussed in more detail below.

The positioning cylinder 12 received within the upper bore 22 is formed with a lower key slot 24, as illustrated in FIG. 5 and 6, and FIGS. 11 through 14. The lower key slot accepts the key projection 31 fixedly secured to the lowermost portion of the reciprocating lock bolt 13. An upper lock bolt recess 25 is formed within the positioning cylinder 12 aligned and overlying the key slot 24 for receiving the reciprocating extensible and retractable latch 30 effected by utilization of a typical key within the key slot 32 formed on the upper surface of the reciprocating lock bolt 13. The positioning cylinder includes a through extending axial bore 26 for receiving the lock bolt 13 therein. Further with reference to FIGS. 11, 13, and 14, the positioning cylinder is formed with a lower threaded bore 27 aligned with an upper smooth bore 28 along an axial center line 29. There are four such aligned threaded bores 27 aligned with smooth bores 28 to receive the threaded rods 27a that maintain the positioning of the positioning cylinder 12 relative to the wheel mount member 15. The use of serrated lock pins 28a when forced into the smooth bores 28 prevent removal or withdrawal of the threaded rods 28a and thereby maintain a positioning of the cylinder 12 relative to the wheel member 15. Reference to FIG. 20 illustrates companion threaded receiving bores 43 in axial alignment with the four threaded bores 27 that receive the threaded rods 27a therein in association with the positioning cylinder 12. In this manner, the positioning cylinder 12 is spaced relative to the wheel mount member 15, as illustrated in FIGS. 5 and 6.

The butterfly latch 14, as illustrated in FIGS. 1 and 5 through 8, is formed with a central cylindrical body 33a with diametrically opposed wings 33. A top surface of the butterfly latch 14 is formed with a conical recess to receive the conical nose 31a of the reciprocating lock bolt 13, as illustrated in FIGS. 5 and 6 for example.

A spring 35 underlying the butterfly latch 14 is received within a bore 45, as illustrated in FIGS. 1 and 20 for example, and is formed with a cylindrical lower body 36 and a conical upper body 37. A threaded blind bore 38 formed within the cylindrical lower body 36 is configured to be threaded onto a typical wheel stud of an automobile to secure an automotive type rim thereon. The upper portion of the conical body 37 is formed with an annular shoulder 39 to accept the tapered nose 21 of a main hexagonal body 11. Depending about the central axis 40 of the wheel mount member 15 are a first and second annular projection 41 and 42 each of less than 180 degrees of arc to form diametrically opposed slots 44 for receiving the wings 33 of the butterfly latch 14 therethrough. The first and second annular projections 41 and 42 are received within the lower bore 23 of the main hexagonal body 11.

Attention should be directed to FIGS. 5 and 6 whereupon positioning an appropriate key within the key slot 32 of the reciprocating lock bolt 13, the extensible and retractable latch 30 is withdrawn into the body of the lock bolt 13. This enables the lock bolt 13 to be forced upwardly by action of the spring 35 acting along the lower side of the butterfly latch 14 and force the lock bolt upwardly and the key projection 31 to nest within the key slot 24 of the positioning cylinder 12. Thereupon the butterfly latch 14 will be oriented such that its wings 33 are within the butterfly receiving slots 44 of the wheel mount member 15 and also within the first and second gaps 18 and 19 of the main hex body 11 thereby joining the main hex body to the wheel mount member to enable securement or removal of the wheel lock apparatus 10 relative to an associated threaded stud within the threaded blind bore 38 of the wheel mount member 15. Conversely, when the reciprocating lock bolt 13 is within a depressed orientation, as illustrated in FIG. 5, the butterfly wings 33 are wholly positioned within the slots 44 of the wheel mount member 15 and the main hexagonal body 11 is truly rotatable relative to the wheel mount member 15 to discourage unwarranted removal of the wheel lock apparatus 10.

The manner of usage and operation of the instant invention therefore should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wheel lock apparatus for selective threaded securement to a threaded boss comprising in combination, an outer hexagonal main body means for selective interlocking securement to a wheel mount member wherein said wheel mount member is formed with a threaded bore axially aligned with said main body means for securement to said threaded boss, and reciprocating latch means axially aligned within said wheel mount means in a retracted first position to disengage said main body means from said wheel mount member and wherein said reciprocating latch means is resiliently biased to a second extended position to interlock said hexagonal main body means to said wheel mount member, and an elongate main body formed with vertical exterior surface flats for enabling securement thereabout by a torquing instrument, and an elongate positioning cylinder mounted within said main body wherein said positioning cylinder includes a recess formed at a lowermost portion thereof receiving a transverse bolt;

said transverse bolt integrally formed to an elongate lock bolt means reciprocatably mounted within said positioning cylinder for securement of said lock bolt means in said positioning cylinder, and a wheel mount member fixedly and spacedly secured relative to said positioning cylinder for securement to said threaded boss, and a latch member positionable in an extended position wherein said lock bolt is in said first position to interlock said main body to said wheel mount, and said latch member positionable in a retracted position when said transverse bolt is oriented below said recess to disengage said wheel mount relative to said main body when said lock bolt is in said second position, and wherein said main body is formed with a plurality of annular ribs extending within an interior bore and projecting beyond an interior surface defined by said interior bore wherein said ribs are provided with a plurality of diametrically opposed gaps to accept said latch member in said extended position and accept said transverse bolt in said first position, and wherein said transverse bolt is positioned to overlie the extensible and retractable latch member and said recess of said positioning cylinder is aligned with and underlying a lock bolt recess for selectively receiving a latch mounted within said lock bolt, and wherein said lock bolt is formed with a forward conical nose positionable within a conical recess formed in said latch member, and wherein said latch member is formed with a central cylindrical body and a plurality of diametrically opposed wings extending from said cylindrical body positionable between said ribs, and wherein said wheel mount is formed with a plurality of annular projections extending above a top surface of said wheel mount member and formed with a diametrically opposed slot for accepting said latch member in said retracted position, and wherein a spring is positioned underlying said latch member and positioned within a blind bore formed to an upper surface of said wheel mount and axially with an underlying threaded bore for securement to said threaded boss, and wherein said wheel mount is formed with a lower clyindrical exterior surface and an upper conical surface, and said upper conical surface is aligned with a lower tapered nose formed to said lower portion of said main body, and wherein a plurality of threaded rods are securable within aligned and opposed threaded bores formed within said annular projections of said wheel mount and confronting bores formed within said positioning cylinder to spatially align and position said positioning cylinder relative said wheel mount.

2. A wheel lock apparatus as set forth in claim 1 wherein the threaded bores are formed within said positioning cylinder and underlying smooth bores to accept serrated lock pins therethrough to prevent unwarranted tampering of said threaded rods.

* * * * *